United States Patent
Yoon

(10) Patent No.: US 9,692,982 B2
(45) Date of Patent: Jun. 27, 2017

(54) SYSTEM FOR CONTROLLING EXPOSURE OF CAMERA AND METHOD THEREOF

(71) Applicant: HYUNDAI MOTOR COMPANY, Seoul (KR)

(72) Inventor: Il Yong Yoon, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/922,480

(22) Filed: Oct. 26, 2015

(65) Prior Publication Data

US 2016/0150144 A1    May 26, 2016

(30) Foreign Application Priority Data

Nov. 26, 2014  (KR) .......................... 10-2014-0166610

(51) Int. Cl.
*H04N 5/235* (2006.01)
(52) U.S. Cl.
CPC ................................ *H04N 5/2351* (2013.01)
(58) Field of Classification Search
None
See application file for complete search history.

(56) References Cited

U.S. PATENT DOCUMENTS

| | | | |
|---|---|---|---|
| 5,949,918 A * | 9/1999 | McCaffrey | G06T 5/009 348/E5.073 |
| 8,885,093 B2 | 11/2014 | Asoma | |
| 9,247,153 B2 | 1/2016 | Umezu | |
| 2007/0009253 A1 | 1/2007 | Nikkanen et al. | |
| 2008/0037897 A1* | 2/2008 | Chiang | G06T 5/009 382/273 |
| 2008/0284872 A1 | 11/2008 | Asoma | |
| 2011/0279710 A1* | 11/2011 | Lee | H04N 5/2351 348/234 |
| 2013/0162855 A1 | 6/2013 | Kannermark et al. | |
| 2014/0205193 A1 | 7/2014 | Umezu | |
| 2015/0312460 A1* | 10/2015 | Benderius | H04N 5/2353 348/364 |

FOREIGN PATENT DOCUMENTS

| | | |
|---|---|---|
| JP | 2005348115 A | 12/2005 |
| JP | 2014143613 A | 8/2014 |
| KR | 10-0601312 B1 | 7/2006 |
| KR | 10-2008-0084685 A | 9/2008 |
| KR | 10-2012-0083671 A | 7/2012 |

* cited by examiner

*Primary Examiner* — Justin P Misleh
(74) *Attorney, Agent, or Firm* — McDermott Will & Emery LLP

(57) ABSTRACT

A system for controlling an exposure of a camera may include: a histogram calculator configured to calculate a histogram from an input image; a virtual histogram generator configured to generate a virtual histogram by differently applying the exposure to the calculated histogram; a histogram hole filter configured to generate a final histogram by filtering a hole generated in the virtual histogram; a histogram uniformity unit configured to perform uniformity of the final histogram; and an optimum exposure setting unit configured to apply an exposure value depending on the uniformized histogram.

13 Claims, 11 Drawing Sheets

SYSTEM FOR CONTROLLING EXPOSURE OF CAMERA AND METHOD THEREOF

CROSS-REFERENCE TO RELATED APPLICATION

This application is based on and claims the benefit of priority to Korean Patent Application No. 10-2014-0166610, filed on Nov. 26, 2014 in the Korean Intellectual Property Office, the disclosure of which is incorporated herein in its entirety by reference.

TECHNICAL FIELD

The present disclosure relates to a system for controlling an exposure of a camera and a method thereof, and more particularly, to a technology of setting an optimum exposure of a camera by generating a virtual histogram.

BACKGROUND

To solve a parking and stopping problem, a traffic problem, a traffic accident, and the like, the case in which camera imaging apparatuses such as black box and CCTV are equipped in a vehicle, a building, and the like has been increased.

In the case of the camera imaging apparatus, an image quality may rely on an exposure, and therefore a technology of automatically controlling an exposure of a camera to improve the image quality by an exposure control has been developed.

However, the existing method of automatically controlling an exposure of a camera controls an average gray of the overall image or an average gray value of some selected points to track a specific value.

The method makes the exposure different depending on surrounding environment and changes brightness of an illumination reflection point by a cornea and thus changes brightness of glint for each frame, which has an adverse effect on threshold setting for glint detection so as to make it difficult to track the glint.

Further, the glint is generally saturated over 255, and therefore when the saturation is absolutely suppressed, a face is too dark and thus face recognition may fail.

SUMMARY

The present disclosure has been made to solve the above-mentioned problems occurring in the prior art while advantages achieved by the prior art are maintained intact.

An aspect of the present disclosure provides a system for controlling an exposure of a camera and a method thereof capable of providing an optimum exposure by generating virtual histograms and performing a control to select the exposure expected to be the highest image quality among the virtual histograms.

According to an exemplary embodiment of the present disclosure, a system for controlling an exposure of a camera includes a histogram calculator configured to calculate a histogram from an input image; a virtual histogram generator configured to generate a virtual histogram by differently applying the exposure to the calculated histogram; a histogram hole filter configured to generate a final histogram by filtering a hole generated in the virtual histogram; a histogram uniformity unit configured to perform uniformity of the final histogram; and an optimum exposure setting unit configured to apply an exposure value depending on the uniformized histogram.

The system may further include: a histogram storage configured to store the calculated histogram; a first temporary histogram storage configured to store the first temporary histogram; and a second temporary histogram storage configured to store the second temporary histogram.

The histogram hole filter may bring and store a value of a left bin of a hole when the hole having a value of 0 is present, increasing an index of bin of the virtual histogram to generate a first temporary histogram and may bring and store a value of a right bin of the hole when the hole having a value of 0 is present, decreasing the index of bin of the virtual histogram to generate a second temporary histogram.

The histogram hole filter may store a value of 0 when any one of the bins of the first temporary histogram and the second temporary histogram has the value of 0 and store an average value of the bins of the first temporary histogram and the second temporary histogram to generate the final histogram when both of the bins of the first temporary histogram and the second temporary histogram do not have the value of 0.

The histogram hole filter may increase values of each bin of the final histogram by 1/k times so that a sum of the entire bins of the final histogram is equal to a sum of the entire bins of the calculated histogram.

The virtual histogram generator may set an exposure factor to be larger than 1 to accumulate a value after a last bin of the calculated histogram among the bins of the virtual histogram when the number of bins of the virtual histogram is larger than the number of bins of the calculated histogram and store the accumulated value as a value of a last bin of the virtual histogram.

The virtual histogram generator may set an exposure factor to be smaller than 1 to store a value of a bin just before a last bin of the virtual histogram as much as the number of remaining bins of the calculated histogram so that number of last bin of the virtual histogram is equal to the number of bins of the calculated histogram when the number of bins of the virtual histogram is smaller than the number of bins of the calculated histogram.

According to another exemplary embodiment of the present disclosure, a method for controlling an exposure of a camera includes calculating and storing a histogram from an input image data; generating a virtual histogram applied by changing an exposure based on the calculated histogram; generating a final histogram by filtering a hole formed in the virtual histogram; performing uniformity on the final histogram; and applying an exposure value depending on the uniformized histogram.

In the generating of the virtual histogram, an exposure factor may be set to be larger than 1 to accumulate a value after a last bin of the calculated histogram among the bins of the virtual histogram when the number of bins of the virtual histogram is larger than the number of bins of the calculated histogram, and the accumulated value may be stored as a value of a last bin of the virtual histogram.

In the generating of the virtual histogram, an exposure factor may be set to be smaller than 1 to store a value of a bin just before a last bin of the virtual histogram as much as the number of remaining bins of the calculated histogram so that number of last bin of the virtual histogram is equal to the number of bins of the calculated histogram when the number of bins of the virtual histogram is smaller than the number of bins of the calculated histogram.

In the generating of the final histogram, a value of a left bin of a hole may be brought and stored when the hole having a value of 0 is present, increasing an index of bin of the virtual histogram to generate a first temporary histogram, and a value of a right bin of the hole may be brought and stored when the hole having a value of 0 is present, decreasing the index of bin of the virtual histogram to generate a second temporary histogram.

In the generating of the final histogram, a value of 0 may be stored when any one of the bins of the first temporary histogram and the second temporary histogram has the value of 0 and an average value of the bins of the first temporary histogram and the second temporary histogram may be stored to generate the final histogram when both of the bins of the first temporary histogram and the second temporary histogram do not have the value of 0.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, most preferred embodiments of the present disclosure will be described in detail with reference to the accompanying drawings so that those skilled in the art may easily implement the spirit of the present disclosure.

Hereinafter, exemplary embodiments of the present disclosure will be described in detail with reference to FIGS. 1 to 10.

Figure 1:
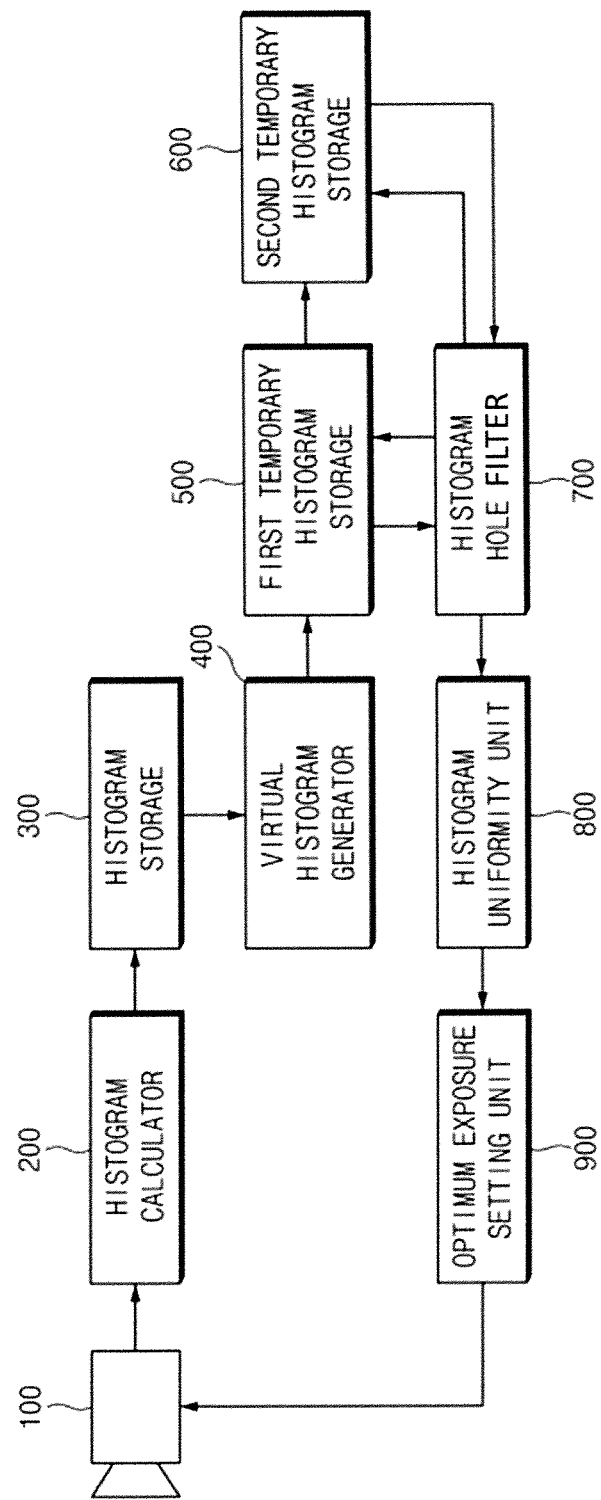
FIG. 1 is a configuration diagram of a system for controlling an exposure of a camera according to an exemplary embodiment of the present disclosure.

FIG. 1 is a configuration diagram of a system for controlling an exposure of a camera according to an exemplary embodiment of the present disclosure.

The system for controlling an exposure of a camera 100 according to an exemplary embodiment of the present disclosure includes a histogram calculator 200, a histogram storage 300, a virtual histogram generator 400, a first temporary histogram storage 500, a second temporary histogram storage 600, a histogram hole filter 700, a histogram uniformity unit 800, and an optimum exposure setting unit 900.

When image data are input from the camera 100, the histogram calculator 200 calculates a histogram from the image data.

The histogram storage 300 stores the histogram calculated by the histogram calculator 200. In this case, the histogram calculated from the image data is referred to as an original histogram.

The virtual histogram generator 400 changes an exposure based on the original histogram stored in the histogram storage 300 to generate virtual histograms for each exposure value.

The histogram calculator 200, the virtual histogram generator 400, the histogram uniformity unit 800, and the optimum exposure setting unit 900 may be implemented with a processor having instructions to cause the processor to execute the above defined functions of the histogram calculator 200, the virtual histogram generator 400, the histogram uniformity unit 800, and the optimum exposure setting unit 900.

A method for generating a virtual histogram will be described below with reference to FIGS. 5A to 5C. Here, a bin represents each slot having a histogram value and bins represent the number of steps of the histogram. Therefore, the bins may represent the number of a last slot of the histogram.

First, the virtual histogram is generated by increasing an exposure applied to the original histogram k times. Herein, the case in which k is larger than 1 and the case in which k is smaller than 1 will be separately described.

Figure 5A:
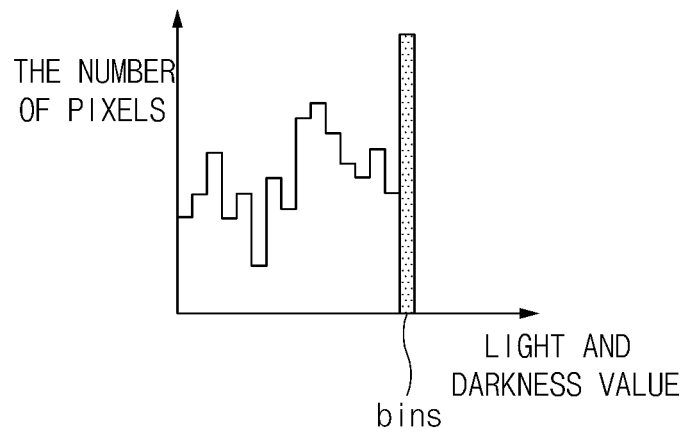
FIG. 5A is an exemplified diagram of the saturated virtual histogram according to the exemplary embodiment of the present disclosure.

FIG. 5A illustrates a saturated histogram.

Referring to FIG. 5A, it is assumed that the virtual histogram is generated by increasing the exposure applied to the original histogram k times. A histogram value of G*bin moves to round (k*bins)bin. In this case, when exceeding a bins value, the value of the round (k*bins)bin is accumulated. In this case, G means a pixel value. For example, when the pixel values (bright and darkness value) is 256 and k is 2, the exposure of the histogram is increased twice and thus 256 becomes 512. In this case, a value of 512 at 257 beyond 256 is accumulated with 256, that is, a bins value.

Meanwhile, the case in which the k is smaller than 1 may be divided into the case in which a value of a temporary histogram round (k*bins) is smaller than a value of (bins−round (k*bins)*histogram (bins−1)) and the case in which a value of a temporary histogram round (k*bins) is larger than a value of (bins−round (k*bins)*histogram (bins−1)). Here, the round (k*bins) means the bins value of the histogram which is exposed k times and the histogram (bins−1) means a previous value of a last bins at the histogram and the round (k*G) means a value obtained by multiplying a total of pixel values by an exposure factor.

Figure 5B:
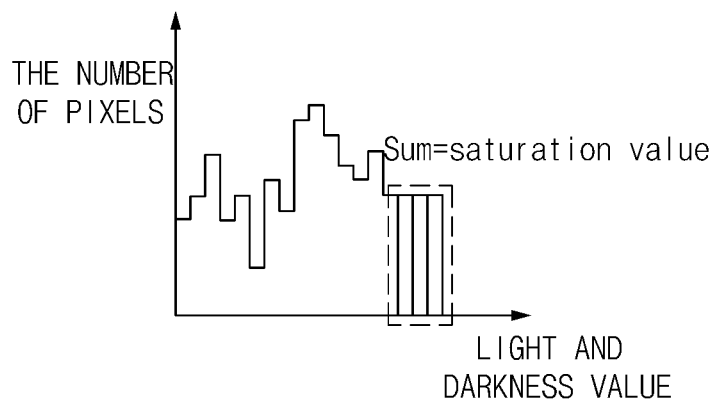
FIG. 5B is an exemplified diagram of the virtual histogram according to the exemplary embodiment of the present disclosure which is saturated, has an exposure factor smaller than 1, and has a value of a temporary histogram round (k*bins) smaller than (bins−round (k*bins)*histogram (bins−1))

FIG. 5B is an exemplified diagram of the virtual histogram in the case in which the value of the temporary histogram round (k*bins) is smaller than (bins−round (k*bins)*histogram (bins−1)) when k is smaller than 1. FIG. 5C is an exemplified diagram of the virtual histogram in the case in which the value of the temporary histogram round (k*bins) is larger than (bins−round (k*bins)*histogram (bins−1)) when k is smaller than 1.

Referring to FIG. 5B, when the value of the temporary histogram round (k*bins) is smaller than (bins−round (k*bins)*histogram (bins−1)) in the case in which the value of the temporary histogram round (k*bins) is saturated and k is smaller than 1, the value of the temporary histogram round (k*bins) is filled with the value of the histogram (bins−1) so as to be equal to a round (k*bins) value. For example, when there is a histogram having 256 pixel values, in the case in which k is 0.5, pixel value is 256*0.5 and therefore the pixel value becomes 128, such that 128 pixel values are lack. Therefore, the virtual histogram having the total of 256 pixel values is generated by filling a histogram just before a final histogram and before being saturated with the histogram (bins−1) and filling the histogram with pixel values from 129 to 256.

The bins are the number of bin and are the largest bin value of the histogram corresponding to maximum brightness. A temporary histogram Round (k*bins) represents how much the maximum brightness of the original histogram is decreased due to the exposure factor smaller than 1. Therefore, the temporary histogram round (k*bins) means that the saturated histogram value moves to the round (k*bins) of the temporary histogram due to the exposure factor smaller than 1. Here, since an actual gray value is not known, even though the saturated value moves due to the exposure, the value is of no significance. Meanwhile, the highest level value among the meaning values is a histogram (bins−1) which is a value just before the original histogram is saturated. Even though the value is decreased due to k, the value is physically reasonable. Therefore, a virtual histogram value is generated in bins larger than the temporary histogram round (k*bins) on the virtual histogram by using the value. When all the bins move, increasing k times, bins after the round (k*bins) are emptied on the temporary histogram. However, since the saturation of the histogram means that there may be values even after that, the emptied bins also need to be filled and a sum of the generated histogram values needs to be equal to the saturated value.

A difference between the bins and the round (k*bins) is that there are (bins−round (k*bins)+1) points which are to be filled. When emptied points are filled with the above histogram (bins−1), a sum of the filled points becomes (bins−round (k*G)*histogram (bins−1)). Further, it is compared whether the sum of the filled points is larger or smaller than the temporary histogram (round (k*bins)) which is the actual saturated value.

When the sum is larger than the saturated value, the point which needs to be filled until the sum is equal to the saturated value is filled and when the sum is smaller than the saturated value, the insufficient value even after being filled needs to be added to the temporary histogram (bins).

Figure 5C:
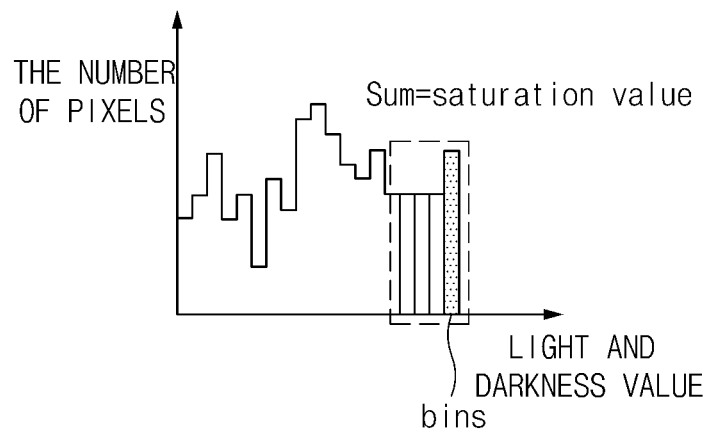
FIG. 5C is an exemplified diagram of the virtual histogram according to the exemplary embodiment of the present disclosure which is saturated, has an exposure factor smaller than 1, and has the value of the temporary histogram round (k*bins) larger than the (bins−round (k*bins) histogram (bins−1))

Referring to FIG. 5C, when the value of the temporary histogram round (k*bins) is larger than (bins−round (k*bins)*histogram (bins−1)) in the case in which k is smaller than 1, the value of the temporary histogram round (k*bins) is filled with the value of the histogram (bins−1) to be equal to the round (k*bins) value and the insufficient portion is added to the bins value. That is, FIG. 5C illustrates the case in which all the saturated values are not set even though emptied places of the temporary histogram are filled with the histogram (bins−1).

Since it does not know how the saturated pixels react when the exposure is decreased in the already saturated state, the histogram value just before being not saturated is once filled with the histogram (bins−1) but an insufficient portion thereof needs to be still saturated again.

Figure 6A:
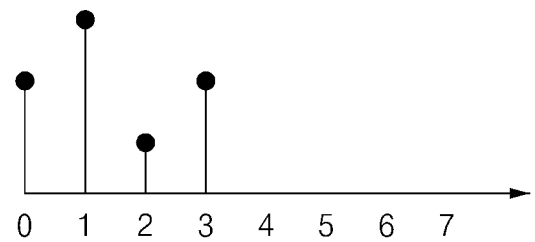
FIG. 6A is an exemplified diagram of an original histogram calculated as an input image.
Figure 6B:
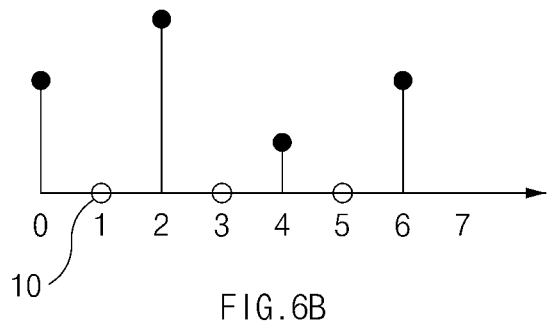
FIG. 6B is a diagram for describing a phenomenon that the hole is generated when an exposure is applied to the histogram of FIG. 6A twice.

When the histogram is extended in response to the exposure factor, the so generated virtual histogram has a hole in which a value is not present. For example, when the exposure of the original histogram is increased twice as illustrated in FIG. 6A, as illustrated in FIG. 6B, holes in which values are not present are generated in 1, 3, 5 grays.

Therefore, the histogram hole filter 700 performs hole filtering on the virtual histogram to generate a first temporary histogram and a second temporary histogram and generates a final histogram from the first temporary histogram and the second temporary histogram. In this case, for convenience, the exemplary embodiment of the present disclosure discloses an example in which the first temporary histogram and the second temporary histogram, that is, two temporary histograms are generated, but the number of temporary histograms is not limited to two and therefore n temporary histograms may be generated.

Figure 7A:
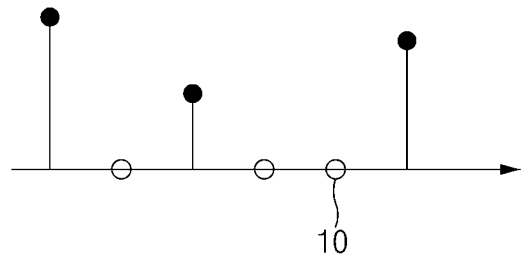
FIG. 7A is an exemplified diagram of the virtual histogram according to the exemplary embodiment of the present disclosure.

For example, as illustrated in FIG. 7A, it is assumed that there is the virtual histogram having the hole.

Figure 7B:
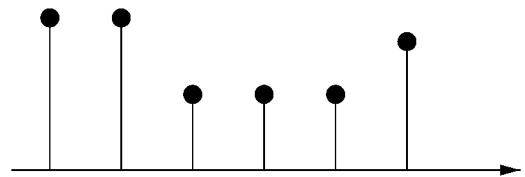
FIG. 7B is an exemplified diagram of a first temporary histogram according to an exemplary embodiment of the present disclosure.

The histogram hole filter 700 brings a left value when a k-th bin is "0", increasing the k of the virtual histogram of FIG. 7A to generate the first temporary histogram as illustrated in FIG. 7B.

Figure 7C:
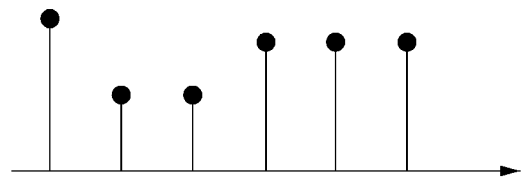
FIG. 7C is an exemplified diagram of a second temporary histogram according to an exemplary embodiment of the present disclosure.

Meanwhile, the histogram hole filter 700 brings a right value when the k-th bin is "0", decreasing the k of the virtual histogram of FIG. 7A to generate the second temporary histogram as illustrated in FIG. 7C.

Figure 7D:
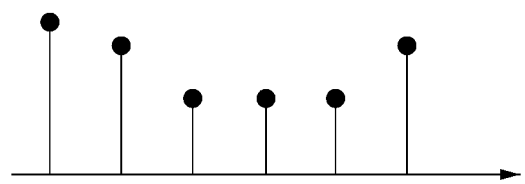
FIG. 7D is an exemplified diagram of a final histogram according to an exemplary embodiment of the present disclosure.

Next, the histogram hole filter 700 selects a value of "0" when any one of the first temporary histogram and the second temporary histogram is "0" and selects and stores an average value of the first temporary histogram and the second temporary histogram when both of the first temporary histogram and the second temporary histogram are not "0" to generate the final histogram as illustrated in FIG. 7D.

Next, the histogram hole filter 700 increases a value up to bins−1 1/k times since a sum of the entire bins is the same.

The first temporary histogram storage 500 stores the virtual histogram and the first temporary histogram and the second temporary histogram storage 600 stores the second temporary histogram. In this case, the exemplary embodiment of the present disclosure discloses two temporary histogram storages such as the first temporary histogram storage 500 and the second temporary histogram storage 600 but is not limited thereto. Therefore, the number of temporary histogram storage may be changed depending on the number of temporary histograms. Further, a separate storage storing the virtual histogram may be provided.

Here, the virtual histogram may be generated based on the original histogram and the first temporary histogram and the second temporary histogram may be generated based on the virtual histogram.

Figure 8:
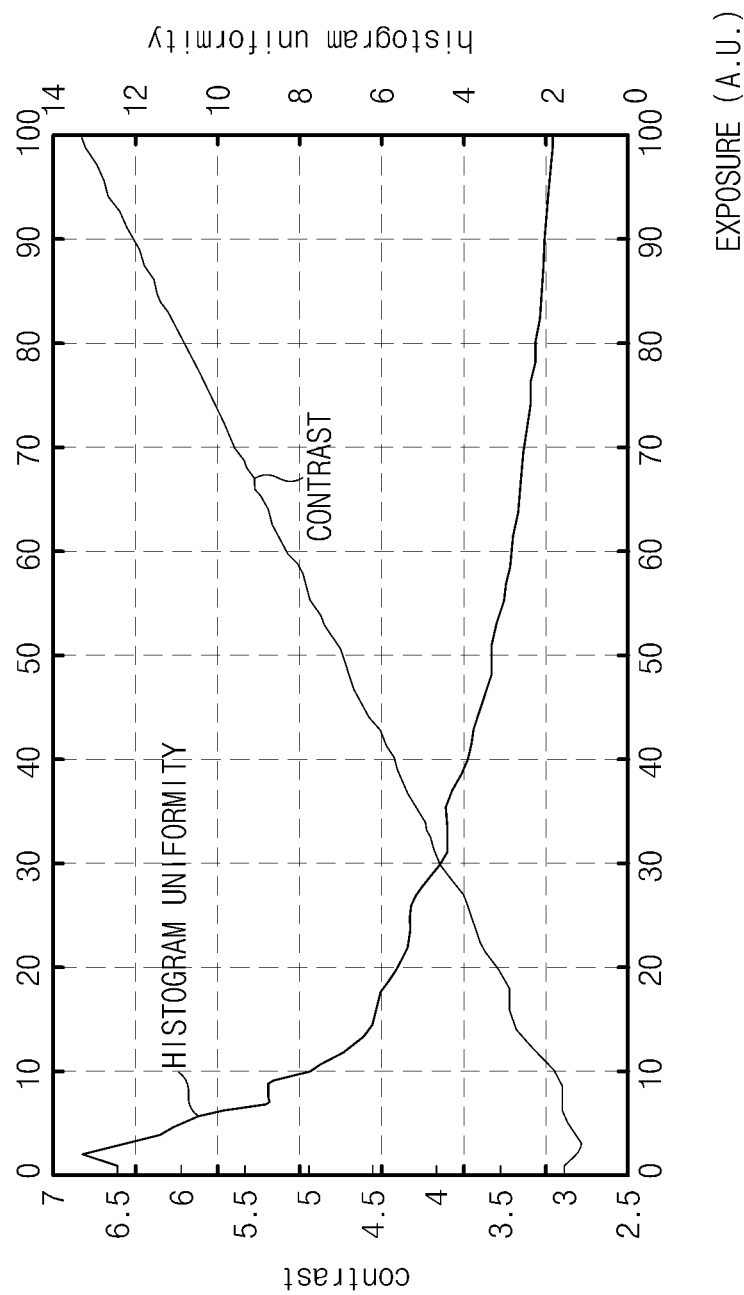
FIG. 8 is a graph for describing histogram uniformity according to an exemplary embodiment of the present disclosure.

Next, the histogram uniformity unit 800 performs uniformity on the final histogram which is generated by being hole-filtered by the histogram hole filter 700. In this case, a local contrast which is directly associated with the image quality relies on the uniformity of the histogram. When the histogram is in the most quantified state, the image quality is good and FIG. 8 is a graph for describing histogram uniformity according to an exemplary embodiment of the present disclosure. Referring to FIG. 8, the local contrast and the histogram uniformity have an inversely proportional correlation and FIG. 8 illustrates the local contrast and the histogram uniformity, increasing an exposure of the same scene.

According to the exemplary embodiment of the present disclosure, as a deviation in data is increased, the dispersion value is increased by using a dispersion value of the histogram data, and thus when the dispersion value in the virtual histogram is largest, it is assumed the image quality is better in proportion to the dispersion value. In the graph of FIG. 8, the uniformity is defined as 1/dispersion value and thus becomes an inversely proportional relation on the graph.

However, an exponent is not necessarily limited to the dispersion value and may be an average and an absolute value of a difference in data in addition to an average and the dispersion value which is a sum of square of the difference in data and a uniformity parameter may also be derived by Fourier transform, and the like.

Further, the uniformity is defined as 1/dispersion value but may be changed by a researcher any time. Meanwhile, the image quality is better when black and white are clearly differentiated, and therefore may be better as the histogram data are distributed over a wide range. Therefore, as an example of a quantification exponent, the dispersion value is suggested but any value which may represent the data distribution such as uniformity may be used.

Figure 2:
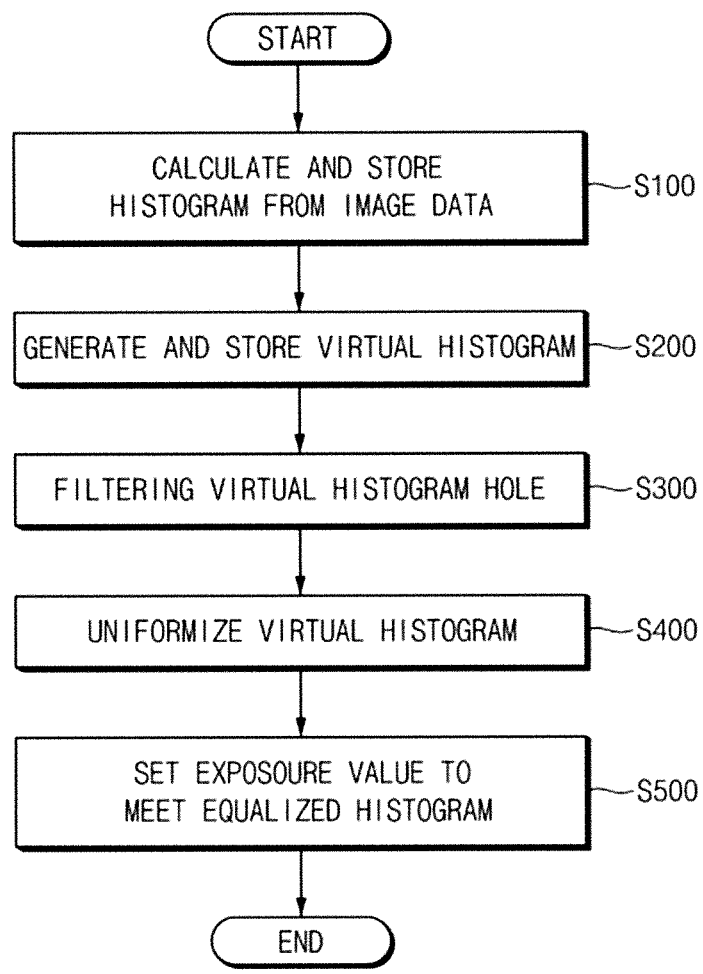
FIG. 2 is a flow chart illustrating a method for controlling an exposure of a camera according to the exemplary embodiment of the present disclosure.

Hereinafter, a method for controlling an exposure of a camera according to an exemplary embodiment of the present disclosure will be described below in detail with reference to FIG. 2.

First, when image data are input, the histogram calculator 200 calculates the histogram from the image data and stores the calculated histogram in the histogram storage 300 (S100). In this case, the calculated histogram is referred to as the original histogram.

The virtual histogram generator 400 changes the exposure based on the stored original histogram to generate and store virtual histograms for each exposure value (S200).

The histogram hole filter 700 performs the hole filtering on the generated virtual histogram to generate the final histogram (S300).

Next, the histogram uniformity unit 800 performs the uniformity on the final histogram (S400).

Next, the optimum exposure setting unit 900 sets the exposure value to meet the uniformized histogram (S500).

Next, the camera 100 applies the optimum exposure value to photograph an object.

As such, the exemplary embodiment of the present disclosure generates the virtual histogram of which the exposure is changed based on the histogram once calculated from the input image data and performs the hole filtering on the virtual histogram to select the exposure expected to be the highest image quality among the virtual histograms and acquire a next image based on the selected exposure.

Figure 3:
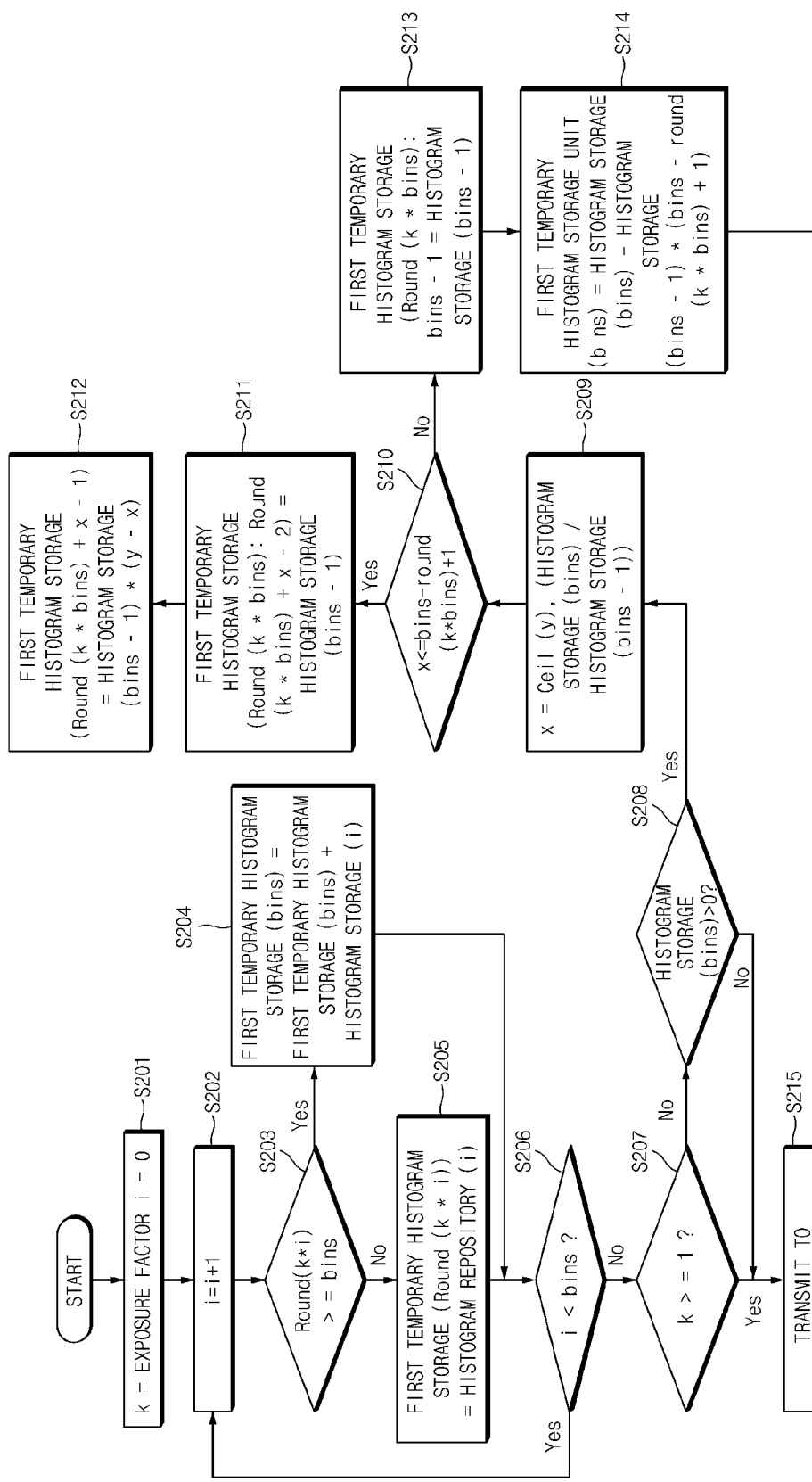
FIG. 3 is a flow chart for describing a method for generating a virtual histogram of FIG. 2.

Hereinafter, the method for generating a virtual histogram of FIG. 2 will be described in detail with reference to FIG. 3. The method for generating a virtual histogram of FIG. 2 is performed mainly by the virtual histogram generator 400 and the histogram according to the exemplary embodiment of the present disclosure has a value from 1 to bins, in which the bins mean a maximum value of the histogram range. Further, the virtual histogram according to the exemplary embodiment of the present disclosure is stored in the first temporary histogram storage 500.

When k is the exposure factor and i is an index of the bin of the histogram, the virtual histogram increase from i=0 (S201).

The virtual histogram generator 400 increases the index of the bin of the histogram by 1 (S202) and it is determined whether Round (k*1) is larger than or equal to the value of bins (S203). That is, it is determined whether the value of k times exceeds the bins value which is a last value. For example, when the histogram has 256 pixel values, it is determined whether the value of k times exceeds 256.

The virtual histogram generator 400 accumulates Round (k*i) when the Round (k*i) is larger than or equal to the value of bins and stores the accumulated Round (k*i) in the first temporary histogram storage 500 to generate the virtual histogram (S204).

Meanwhile, when the Round (k*i) is smaller than the value of bins, the virtual histogram generator 400 stores the corresponding value in the corresponding index of the first temporary histogram storage 500 (S205).

Next, the virtual histogram generator 400 determines whether an index i of bin is smaller than bins which are a last index (S206) and if it is determined that the index i of bin is smaller than the bins which are the last index, the processes S202 to S205 are repeatedly performed.

On the other hand, when the index i of bin is larger than or equal to the bins which are the last index, the virtual histogram generator 400 determines whether k which is the exposure factor is equal to or larger than 1 (S207).

Next, if it is determined that the exposure factor k is equal to or larger than 1, the virtual histogram generator 400 transmits the virtual histogram to the histogram hole filter 700 (S215).

Meanwhile, if it is determined that the exposure factor k is smaller than 1, the virtual histogram generator 400 determines whether the histogram is saturated (S208).

When the histograms is saturated, the virtual histogram generator 400 transmits the virtual histogram to the histogram hole filter 700 and when the histogram is not saturated, the virtual histogram generator 400 obtains a y coordinate value by dividing the value of bins of the histogram by a value of (bins−1) just before the value of bins and ceils the y coordinate value to calculate an x value (S209).

Next, the virtual histogram generator 400 determines whether the x value is larger than (bins−round (k*bins)+1) (S210). Here, (bins−round (k*bins)+1) is the number of bins which is to be filled on the temporary histogram.

Here, if it is determined that the x value is smaller than the (bins−round (k*bins)+1), the virtual histogram generator 400 fills the bins with a value just before being saturated so as to be equal to a round (k*bins) value (S211). That is, the bin of the original histogram is 256 and when k is 0.5, the bin is 128 and therefore a 127-th value is filled between 129 and 255. Next, the virtual histogram generator 400 processes a histogram storage(bins−1)*(y−x) value as a last value (S212).

Meanwhile, if it is determined that the x value is larger than the (bins−round (k*bins)+1), the virtual histogram generator 400 fills the bins with a value just before being saturated so as to be equal to a round (k*bins) value and adds the insufficient portion to the value of bins (S213 and S214).

Figure 4:
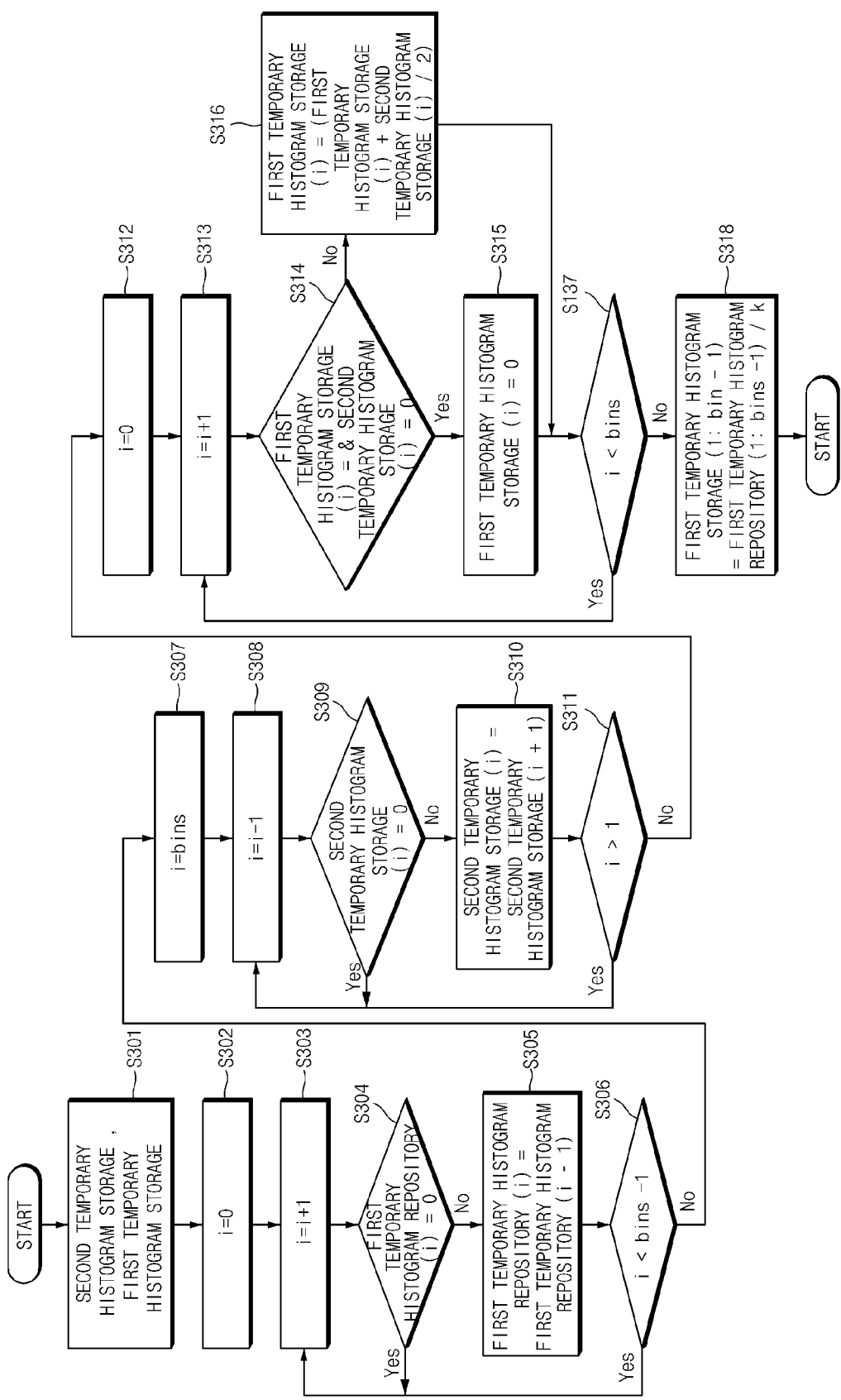
FIG. 4 is a flow chart for describing a method for filtering a virtual histogram hole of FIG. 2.

Hereinafter, a method for performing hole filtering on a virtual histogram will be described in detail with reference to FIG. 4. The method for performing hole filtering on a virtual histogram is performed mainly by the histogram hole filter 700.

First, the histogram hole filter 700 copies the virtual histogram, which is stored in the first temporary histogram storage 500, to the second temporary histogram storage 600 (S301).

The histogram hole filter 700 starts from the index i=0 of the virtual histogram (S302) to increase the index i of the virtual histogram by 1 (S303) and determine whether a value of the index i of the virtual histogram stored in the first temporary histogram storage 500 is 0 (S304).

If it is determined that the index i of the virtual histogram is not 0, the above process S303 is repeatedly performed to determine whether the index which is a value of 0 is present, increasing the index i by 1.

When the index i of the virtual histogram has a value of 0, the histogram hole filter 700 stores a value of an index (i−1) on the left of the index i of the virtual histogram in the index i (S305). By this, the first temporary histogram is generated.

Next, the histogram hole filter 700 determines whether the corresponding index i is smaller than the index (bins−1) just before the bins (S306) and if it is determined that the corresponding index i is smaller than the index (bins−1) just before the bins, the above processes S303 to S306 are repeatedly performed and if it is determined that the corresponding index i is larger than the index (bins−1) just before the bins, the index i is designated as the bins which is the last index (S307).

Next, the histogram hole filter 700 decreases the index i by 1 from the bins which is the last index (S308) and determines whether the value of the index i of the virtual histogram of the second temporary histogram storage 600 is 0 (S309). That is, the histogram hole filter 700 decreases the index i by 1 from the bins which is the last index and determines whether the value is 0.

Next, when the corresponding index does not have a value of 0, the histogram hole filter 700 repeats the above process S308 to decrease the index by 1 and when the corresponding index i has a value of 0, stores a value of an index (i+1) on the right of the corresponding index i in the corresponding index (i) (S310). By this, the second temporary histogram is generated.

Next, the final histogram is generated from the first temporary histogram and the second temporary histogram.

First, the histogram hole filter 700 determines whether the index i is larger than 1 (S311) and if it is determined that the index i is larger than 1, repeatedly performs the above processes S308 to S310.

When the index i is smaller than 1, i is set to be equal to 0 (S312) and the index i is increased by 1 (S313).

The histogram hole filter 700 compares each index of the first temporary histogram and the second temporary histogram to determine whether any one of the two indexes has a value of 0 (S314).

If it is determined that the two indexes do not have 0 by comparing each index of the first temporary histogram and the second temporary histogram, the histogram hole filter 700 stores an average value of each index of the first temporary histogram and the second temporary histogram in the corresponding index (S316).

Meanwhile, when any one of the two indexes has a value of 0 by comparing each index of the first temporary histogram and the second temporary histogram, the histogram hole filter 700 stores the value of 0 in the corresponding index (S315).

Next, the histogram hole filter 700 determines whether i is smaller than the bins (S317) to repeatedly perform the above processes S313 to S316 when the i is smaller than the bins. If it is determined that i is larger than the bins, the stored final histogram is increased by 1/k times to be equal to a sum of the bins of the original histogram (S318).

Figure 9A:
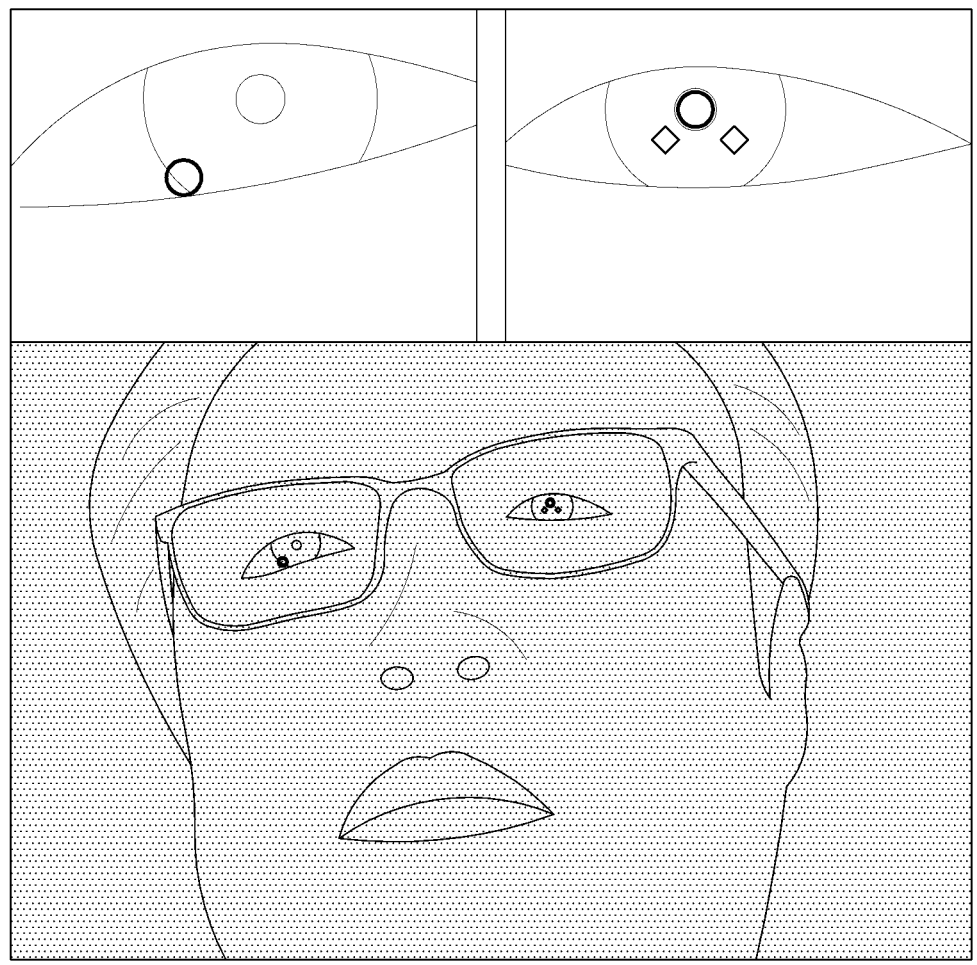
FIG. 9A is an exemplified diagram when a pupil and glint recognition fails at the time of fixed exposure.
Figure 9B:
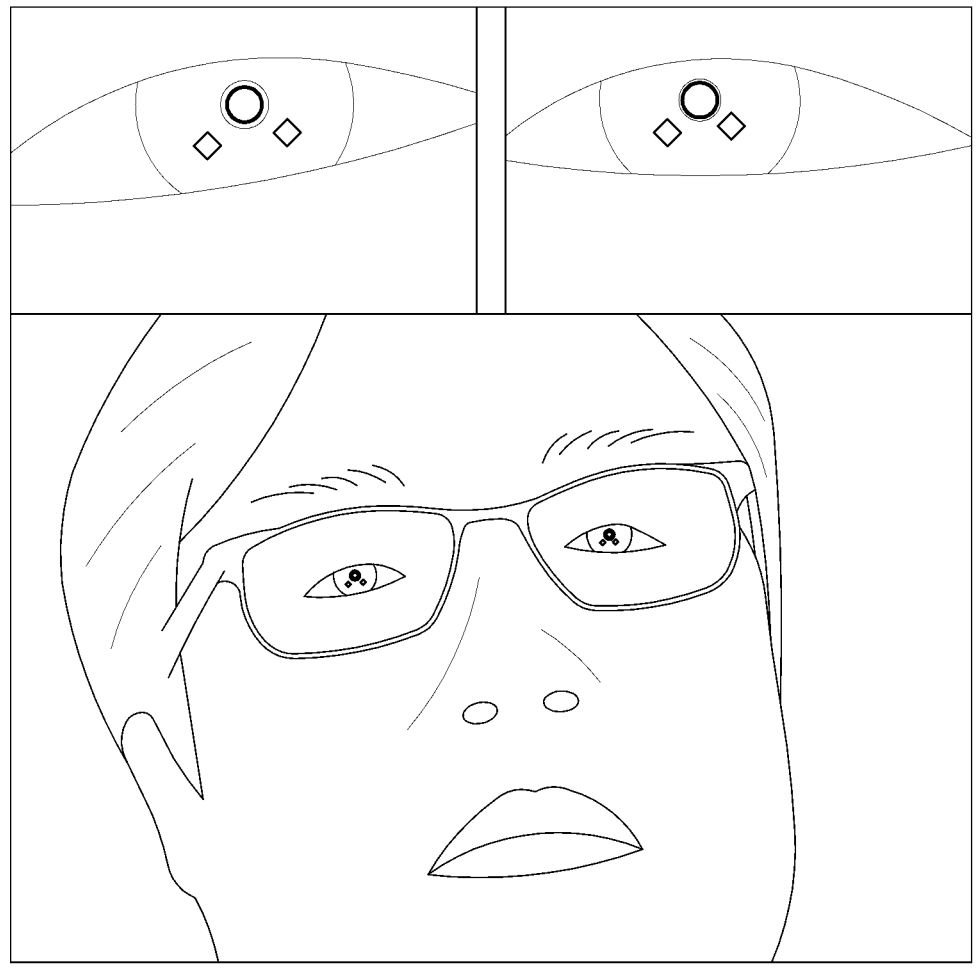
FIG. 9B is an exemplified diagram of a case in which a pupil and glint detection success rate is increased by performing an exposure control according to the exemplary embodiment of the present disclosure.

FIG. 9A is an exemplified diagram when a pupil and glint recognition fails at the time of fixed exposure and FIG. 9B is an exemplified diagram of a case in which a pupil and glint detection success rate is increased by performing an exposure control according to the exemplary embodiment of the present disclosure.

Figure 10:
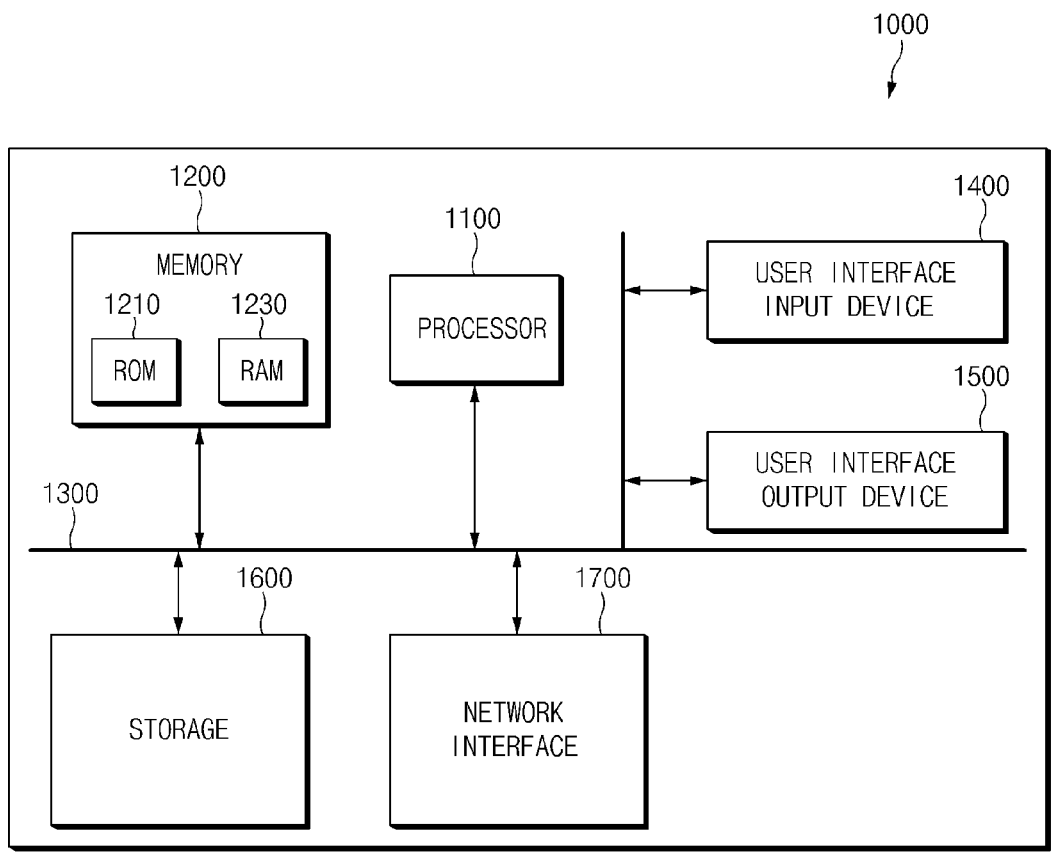
FIG. 10 is a diagram illustrating a hardware configuration to which an algorithm for controlling an exposure of a camera according to an exemplary embodiment of the present disclosure is applied.

Referring to FIG. 10, a computing system 1000 may include at least one processor 1100, a memory 1200, a user interface input device 1400, a user interface output device 1500, a storage 1600, and a network interface 1700 which are connected via a bus 1300.

The processor 1100 may be a semiconductor device which executes processing on instructions stored in a central processing unit (CPU) or the memory 1200 and/or the storage 1600. The memory 1200 and the storage 1600 may include various kinds of volatile or nonvolatile storage media. For example, the memory 1200 may include a read only memory (ROM) 1210 and a random access memory (RAM) 1230.

Therefore, steps of a method or algorithm which is described in connection with exemplary embodiments disclosed in the present specification may be directly implemented by hardware, a software module, or a combination thereof which are executed by the processor 1100. The software module may reside in the storage media (that is, memory 1200 and/or storage 1600) such as an RAM memory, a flash memory, an ROM memory, an EPROM memory, an EEPROM memory, a register, a hard disk, a detachable disk, and a CD-ROM. The exemplified storage medium is coupled with the processor 1100 which may read information from the storage media and write the information in the storage medium. As another method, the storage medium may be integrated with the processor 1100. The processor and the storage medium may reside in an application specific integrated circuit (ASIC). The ASIC may reside in a user terminal. As another method, the processor and the storage medium may reside in the user terminal as an individual component.

As described above, according to the exemplary embodiments of the present disclosure, it is possible to improve the image quality by providing the optimum exposure conditions when the camera photographs an image.

The exemplary embodiments of the present disclosure described above have been provided for illustrative purposes. Therefore, those skilled in the art will appreciate that various modifications, alterations, substitutions, and additions are possible without departing from the scope and spirit of the present disclosure as disclosed in the accompanying claims and such modifications, alterations, substitutions, and additions fall within the scope of the present disclosure.

What is claimed is:

1. A system for controlling an exposure of a camera, comprising:
a processor including:
a histogram calculator configured to calculate a histogram from an input image;
a virtual histogram generator configured to generate a virtual histogram by differently applying the exposure to the calculated histogram;
a histogram hole filter configured to generate a final histogram by filtering a hole generated in the virtual histogram;
a histogram uniformity unit configured to perform uniformity of the final histogram; and
an optimum exposure setting unit configured to apply an exposure value depending on the uniformized histogram.

2. The system according to claim 1, further comprising:
a histogram storage configured to store the calculated histogram.

3. The system according to claim 1, wherein the histogram hole filter brings and stores a value of a left bin of a hole when the hole having a value of 0 is present, increasing an index of bin of the virtual histogram to generate a first temporary histogram, and
brings and stores a value of a right bin of the hole when the hole having a value of 0 is present, decreasing the index of bin of the virtual histogram to generate a second temporary histogram.

4. The system according to claim 3, further comprising:
a first temporary histogram storage configured to store the first temporary histogram; and a second temporary histogram storage configured to store the second temporary histogram.

5. The system according to claim 3, wherein the histogram hole filter stores a value of 0 when any one of the bins of the first temporary histogram and the second temporary histogram has the value of 0, and stores an average value of the bins of the first temporary histogram and the second temporary histogram to generate the final histogram when both of the bins of the first temporary histogram and the second temporary histogram do not have the value of 0.

6. The system according to claim 5, wherein the histogram hole filter increases values of each bin of the final histogram by 1/k times so that a sum of the entire bins of the final histogram is equal to a sum of the entire bins of the calculated histogram.

7. The system according to claim 1, wherein the virtual histogram generator sets an exposure factor to be larger than 1 to accumulate a value after a last bin of the calculated histogram when index of last bin of the virtual histogram is larger than the number of bins of the calculated histogram, and stores the accumulated value as a value of the last bin of the virtual histogram.

8. The system according to claim 1, wherein the virtual histogram generator sets an exposure factor to be smaller than 1 to store a value of a bin just before a last bin of the virtual histogram as much as the number of remaining bins of the calculated histogram so that the number of last bins of the virtual histogram is equal to the number of bins of the calculated histogram when the number of bins of the virtual histogram is smaller than the number of bins of the calculated histogram.

9. A method for controlling an exposure of a camera, comprising steps of:
calculating and storing a histogram from an input image data;
generating a virtual histogram by changing an exposure based on the calculated histogram;
generating a final histogram by filtering a hole formed in the virtual histogram;
performing uniformity on the final histogram; and applying an exposure value depending on the uniformized histogram.

10. The method according to claim 9, wherein in the step of generating the virtual histogram, an exposure factor is set to be larger than 1 to accumulate a value after a last bin of the calculated histogram among the bins of the virtual histogram when index of last bin of the virtual histogram is larger than the number of bins of the calculated histogram, and the accumulated value is stored as a value of a last bin of the virtual histogram.

11. The method according to claim 9, wherein in the step of generating the virtual histogram, an exposure factor is set to be smaller than 1 to store a value of a bin just before a last bin of the virtual histogram as much as the number of remaining bins of the calculated histogram so that the number of last bins of the virtual histogram is equal to the number of bins of the calculated histogram when the number of bins of the virtual histogram is smaller than the number of bins of the calculated histogram.

12. The method according to claim 9, wherein in the step of generating the final histogram, a value of a left bin of a hole is brought and stored when the hole having a value of 0 is present, increasing an index of bin of the virtual histogram to generate a first temporary histogram, and
a value of a right bin of the hole is brought and stored when the hole having the value of 0 is present, decreasing the index of bin of the virtual histogram to generate a second temporary histogram.

13. The method according to claim 12, wherein in the step of generating the final histogram, a value of 0 is stored when any one of the bins of the first temporary histogram and the second temporary histogram has the value of 0 and an average value of the bins of the first temporary histogram and the second temporary histogram is stored to generate the final histogram when both of the bins of the first temporary histogram and the second temporary histogram do not have the value of 0.

* * * * *